R. R. BARTLETT.
CAMP COOK KIT.
APPLICATION FILED DEC. 3, 1913.

1,202,148.

Patented Oct. 24, 1916.

WITNESSES:
Percy M. Morse
Carl M. Noble

Robert R. Bartlett,
INVENTOR

By
ATTORNEY

UNITED STATES PATENT OFFICE.

ROBERT R. BARTLETT, OF HOOD RIVER, OREGON.

CAMP COOK KIT.

1,202,148.  Specification of Letters Patent. Patented Oct. 24, 1916.

Application filed December 3, 1913. Serial No. 804,369.

*To all whom it may concern:*

Be it known that I, ROBERT R. BARTLETT, a citizen of the United States, residing in the city of Hood River, county of Hood River, and State of Oregon, have invented certain new and useful Improvements in Camp Cook Kits, of which the following is a specification.

My invention relates to certain improvements in camp cook kits whereby I provide a kit containing a relatively large number of utensils for camp purposes and which are adapted to be nestled together in the smallest possible space, the kit being adapted to fit into a side pocket, and also to be secured to a belt, if desired.

I have shown the invention in the accompanying sheet of drawings and will describe the same.

Figures 1, 2:
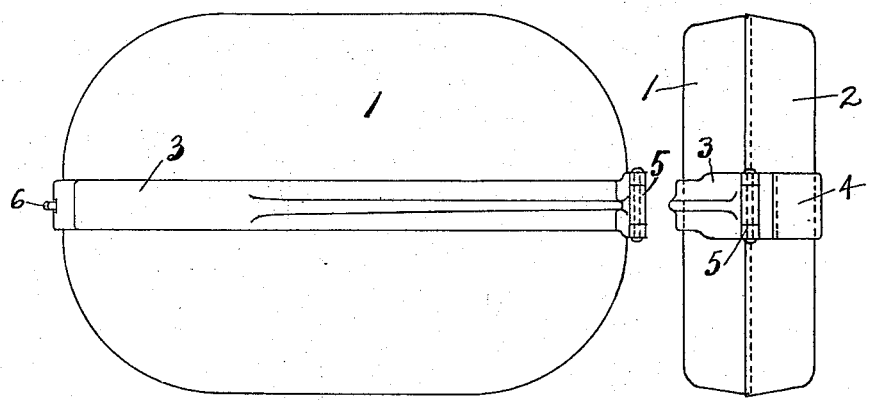
Figures 3, 4:
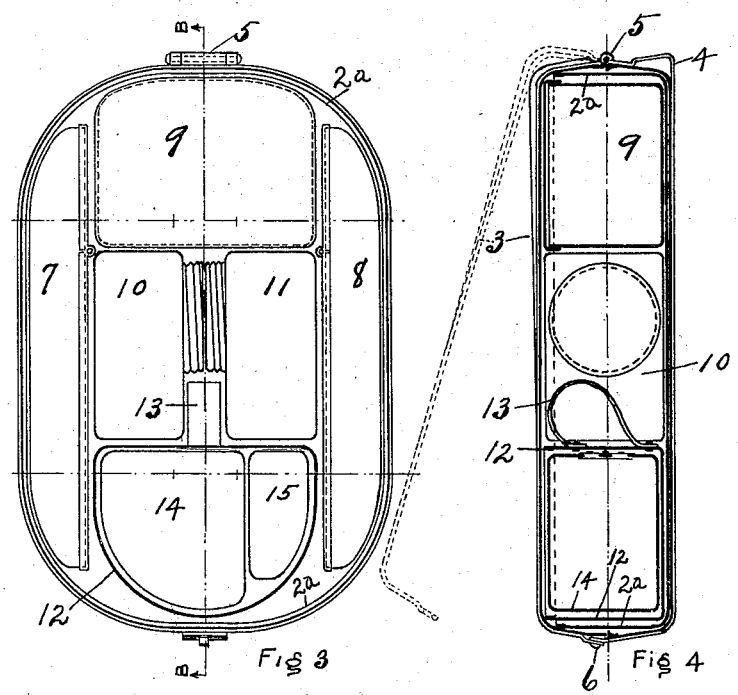

Figure 1 is a top plan view of the kit; Fig. 2 is an end view thereof; Fig. 3 is a view with the cover removed and showing the nestled utensils; and Fig. 4 is an edge view, as on line B—B of Fig. 3.

Referring to the drawings, 1 designates a top pan or cover adapted to fit in an inverted manner upon a bottom pan 2, and to form therewith a kit or case for other utensils, said top pan being separate and detachable from the bottom pan. The top and bottom pans are secured together by means of a two-part metal band or strip, 3—4, the part 4 being secured to the bottom of the bottom pan, extending lengthwise thereof, as indicated, and the part 3 being hingedly secured at one end, as at 5, to the part 4, and adapted to be folded over the top pan so as to meet the opposite end of the part 4, and to latch therewith, as at 6, in any desired manner. The part 3 of said strap is also adapted to be opened back so as to project laterally from said bottom pan and constitutes a handle therefor, thereby forming a skillet or frying pan. The part 4 of said band or strap is also formed, as at 4, Fig. 4, to receive a belt, whereby the kit can be attached to and carried by the belt, if so desired. Mounted within the bottom pan 2, and fitting closely therein, is a second pan 2ª, having a depth slightly less than the combined depths of the top and bottom pans 1 and 2.

7 and 8 designate two side receptacles formed to fit closely within and against the sides of the inner pan 2ª, each being provided with covers, as indicated.

9 indicates a covered box fitting in the end of the pan 2ª, between the ends of the side receptacles 7 and 8. 10 and 11 designate two canisters, nestled between the side receptacles 7 and 8, and having their screw tops placed together, as clearly indicated. In the opposite end of said pan 2ª is a drinking cup 12, with its handle 13 occupying the space between said canisters 10 and 11, as clearly indicated.

14 and 15 designate, respectively, salt and pepper shakers adapted to fit and nestle closely together within the cup 12.

Thus I am able to nestle together eleven different utensils, specially formed for that purpose, and to inclose all of them in a minimum amount of space, the whole kit being adapted to be easily placed in a side pocket, and the outer pans being so clamped together by means of the combination skillet handle and clamping strap that a strong kit is formed, capable of being attached to a belt, if it is not desired to carry it in the pocket.

The kit is especially adapted for use on hikes and camping trips such as are frequently taken by the Boy Scouts, Y. M. C. A. and other boys' clubs, and while it is possible to make slight changes in the invention as here embodied without departing from the spirit thereof, I do not limit the invention to the particular showing here made for purposes of illustration, except as I may be limited by the hereto appended claims.

I claim:

1. A camp cook kit comprising in combination a bottom pan, a top pan adapted to fit thereon as a cover, a two-part metal band, one part of which is secured to the bottom pan, and the other part of which is adapted to clamp over the top pan, said latter part being adapted to be opened in alinement with the part secured to the bottom pan, and having a bearing thereupon, whereby to form a handle for said lower pan, and means for clamping the two ends of said two-part band together in folded condition, whereby to constitute a continuous band about said pans.

2. A camp cook kit comprising a bottom pan and a top pan adapted to fit thereover in inverted position, as a cover, a combination clamping band hingedly secured at one end, and adapted to be folded over said top pan to secure the latter in place, and to be opened to project from said lower pan as a handle, said device being provided with a belt receiving loop, and a plurality of specially formed interfitting utensils, adapted to fit within said pans, substantially as described.

3. In a camp cook kit, a top pan, a bottom pan, a two-part combination clamp band and handle, one part of which is secured against the bottom of said bottom pan and provided with a belt loop at the end of said pan, and the other part is hingedly secured to said first part, and adapted to be detachably secured to the opposite end of said first part, when in folded condition, and to be opened out laterally to constitute a handle for said bottom pan, and a plurality of specially shaped utensils fitted within said pan, substantially as described.

Signed at Portland, Oregon, this 26th day of November, 1913.

ROBERT R. BARTLETT.

In presence of:
R. B. FRENCH,
W. C. SMITH, Jr.

Copies of this patent may be obtained for five cents each, by addressing the "Commissioner of Patents, Washington, D. C."